(12) United States Patent
Harris et al.

(10) Patent No.: US 7,912,649 B2
(45) Date of Patent: Mar. 22, 2011

(54) GEOPHYSICAL SURVEYING

(75) Inventors: Peter Harris, Oslo (NO); Joel Walls, Houston, TX (US)

(73) Assignee: OHM Limited, Aberdeen (GB)

( * ) Notice: Subject to any disclaimer, the term of this patent is extended or adjusted under 35 U.S.C. 154(b) by 300 days.

(21) Appl. No.: 12/157,108

(22) Filed: Jun. 6, 2008

(65) Prior Publication Data
US 2009/0306899 A1 Dec. 10, 2009

(51) Int. Cl.
*G01V 1/00* (2006.01)
(52) U.S. Cl. .................. 702/13; 702/7; 702/11; 702/14; 367/9; 367/14; 367/25
(58) Field of Classification Search ................ 702/7, 11, 702/13, 14; 367/9, 14, 25
See application file for complete search history.

(56) References Cited

U.S. PATENT DOCUMENTS

2008/0319674 A1* 12/2008 Dai et al. .......................... 702/6
2009/0306900 A1* 12/2009 Jing et al. ........................ 702/13

OTHER PUBLICATIONS

Hordt, A. and Strack, K.M. "Reservoir Surveying Through the Combined Use of Seismic and Electromagnetic Methods." (English Translation from the Original German), Interpretation Strategies in Exploration and Production, 14th Mintrop Seminar, Arnsberg-Neheim, May 3-6, 1994.
Hordt, A. and Strack, K.M. "Reservoirerkundung Durch Kombinierten Einsatz Seismischer Und Elektromagnetischer Verfahren." Interpretations—Strategien in Exploration and Produktion, 14th Mintrop Seminar, Arnsberg-Neheim, May 3-6, 1994.
Hoversten, G., Cassassuce, F., Gasperikova, E., Newman, G., Chen, J., Rubin, Y., Hou, Z. and Vasco, D. "Direct reservoir parameter estimation using joint inversion of marine seismic AVA and CSEM data." Geophysics, May-Jun. 2006, vol. 71, No. 3, p. C1-C13, Society of Exploration Geophysicists.
Constable, S. and Weiss, C. "Mapping thin resistors and hydrocarbons with marine EM methods: Insights from 1D modeling." Geophysics, Mar.-Apr. 2006, vol. 71, No. 2, p. G43-G51, Society of Exploration Geophysicists.
Harris, P. and MacGregor, L. "Determination of reservoir properties from the integration of CSEM and seismic data." First Break, Nov. 2006, vol. 24, p. 15-21, EAGE.
MacGregor, L. and Harris, P. "Marine CSEM Sounding: Moving Beyond the Image." Innovation in EM, Gray and Mag Methods: a new Perspective for Exploration, EGM 2007 International Workshop, Capri, Italy, Apr. 15-18, 2007.
Veeken, P. and Rauch-Davies, M. "AVO attribute analysis and seismic reservoir characterization." First Break, Feb. 2006, vol. 24, p. 41-52, EAGE.
Organizers: Esmersoy, C., Allegar, N., and Strack, K. "Integration of Seismic and Electromagnetic Measurements Workshop." SEG International Exhibition and 76th Annual Meeting, Oct. 1-6, 2006, New Orleans.

* cited by examiner

*Primary Examiner* — Mohamed Charioui
*Assistant Examiner* — Elias Desta
(74) *Attorney, Agent, or Firm* — Locke Lord Bissell & Liddell LLP

(57) ABSTRACT

Joint processing of seismic and controlled source electromagnetic (CSEM) surface data is performed by using a common rock physics model which relates reservoir properties (such as porosity, lithology, saturation, and shaliness) to surface seismic AVO (or AVA) data. This allows one to determine how perturbations in the reservoir properties affect surface data. This can be carried out by systematically changing the reservoir properties and examining the effect on the synthetic data. This allows the hydrocarbon type of a reservoir to be established, e.g. oil or gas, as well as the saturation level of the hydrocarbon in the reservoir, which is useful for determining whether the reservoir has a non-commercial, low hydrocarbon saturation or a commercial, high hydrocarbon saturation.

16 Claims, 9 Drawing Sheets
(6 of 9 Drawing Sheet(s) Filed in Color)

GEOPHYSICAL SURVEYING

BACKGROUND ART

The invention relates to geophysical surveying. More particularly the invention relates to geophysical surveying for resistive and/or conductive bodies. Such bodies might, for example, comprise oil, gas, methane hydrates etc. or other hydrocarbon reserves, or subterranean salt bodies.

Seismic reflection survey techniques are well known and provide well established methods for identifying structural features in subterranean rock strata, e.g., distinct layers and potential fluid reservoirs.

Traditional seismic reflection surveys practiced by the oil industry use stacked seismic data. Until the 1980s it was standard oil industry practice to assume that stacked seismic data only contained information about so-called P-waves, which are the compressional or longitudinally oscillating acoustic waves, and did not include information relating to the shear or transversely oscillating waves, which are known as S-waves. It was known that P-waves and S-waves propagate differently in gas, since P-waves are strongly affected by the incompressibility of gas, whereas S-waves are not. Consequently, it was known that the P- and S-wave responses could be compared as a gas indicator. However, most seismic surveys did not collect S-wave data, so it was assumed that conventional stacked seismic data could only be used for determining geological structure. However, in the 1980s (Ostrander 1984), it was realised that stacked seismic data could also be used as a direct hydrocarbon indicator, since, for non-normal incidence of the seismic ray trace with a layer boundary, incident P-waves partially excite S-waves, and the degree to which this occurs is a function of angle of incidence and is also dependent on the respective acoustic impedances (AIs) of the layers either side of the reflection boundary. The AI of the P-wave is the product of its velocity $V_P$ and the density of the medium $\rho$ of the relevant layer. Similarly, the S-wave AI is the product of its velocity $V_S$ and the density of the medium $\rho$. Consequently, by measuring the variation of reflection amplitude versus angle (AVA), or more usually the variation of amplitude versus offset (AVO) for a common depth point (CDP), a direct gas or oil indicator is provided. It is noted that "offset" is the standard term used in the art for the distance between the transmitter and the receiver.

FIG. 1A schematically shows a typical AVO survey carried out in a marine environment.

A surface vessel 14 is illustrated undertaking a seismic AVO survey of a subterranean strata configuration. The subterranean strata configuration in this example includes an overburden layer 8, an underburden layer 9 and a hydrocarbon reservoir 12. The overburden layer 8 is bounded above by the seafloor 6 and below by its interface 5 with the hydrocarbon reservoir 12. The surface vessel 14 floats on the surface 2 of a body of water, in this case seawater 4 of depth h meters. An airgun or other acoustic source 10 is attached to the vessel 14 by a cable 15 by which it is towed. A further cable 14 is also attached to the vessel 14 and has attached to it a plurality of hydrophones or other acoustic sensors $18_1$, $18_2$ ... $18_n$ which are generally evenly spaced along the further cable 14. The distal end of the further cable 14 has a buoy 17 attached to it which can assist location of the end of the string of hydrophones, and also be used to track the precise location of the end of the string during the survey, for example via a global positioning sensor housed on the buoy 17. The acoustic transmitter 10 and receivers 18 are typically positioned at a height relatively close to the surface 2. In the figure, the incident and reflected ray paths from the transmitter 10 to selected ones of the receivers 18 via the overburden/hydrocarbon interface 5 are also illustrated. As can be seen, the angle of reflection from the vertical θ gradually increases with offset. It will be understood that the data collected at different times in a linear tow path are combined so that the reflections from the same point, i.e. the common depth point, are compared.

Unfortunately, while AVO techniques can often reliably indicate the presence (or absence) of gas, oil or other hydrocarbon, and also the concentration of oil, they are not always able to determine the concentration of gas. Reservoirs are typically characterised by their water, gas and oil saturations ($S_w$, $S_g$, $S_o$). Clearly, to be commercially viable, a reservoir needs a relatively high gas and/or oil saturation, for example >70%. However, it is well known that AVO methods cannot distinguish between a non-commercial, low-saturation gas reservoir and a commercial, high-saturation gas reservoir. On the other hand, determination of oil saturation is generally possible with AVO methods. A recent summary of AVO techniques can be found in Veeken & Rauch-Davies 2006.

It is known that controlled source electromagnetic (CSEM) survey techniques can be used to overcome limitations of seismic methods in general, and AVO methods in particular, preferably by jointly utilizing the CSEM and seismic data. CSEM methods are a type of electromagnetic survey method, and are to be compared with magnetotelluric (MT) survey methods which employ naturally occurring background radiation as the source.

CSEM techniques distinguish reservoir content on the basis of their differing resistivities. Essentially, hydrocarbon (e.g. oil, gas, hydrate) is relatively resistive, whereas seawater is relatively conductive, so the resistivity of a reservoir layer is a direct indicator of its content. A conductive feature, such as a salt body, is similarly identified by its resistivity contrast with surrounding volumes.

FIG. 1B schematically shows a surface vessel 14 undertaking marine controlled source electromagnetic (CSEM) surveying of a subterranean strata configuration according to a standard technique (see Constable & Weiss 2005 and references therein). The subterranean strata configuration is taken the same as for the above AVO seismic example and the same reference numerals are used for the same features. A submersible vehicle 19 carries a high current electrical source to drive a horizontal electric dipole (HED) antenna 22. The submersible vehicle 19 is attached to the surface vessel 14 by an umbilical cable 16. The HED antenna 22 is supplied with a drive current so that it broadcasts an HED electromagnetic (EM) signal into the seawater 4. The HED transmitter is typically positioned a height of around 50 meters or so above the seafloor 6. An array of remote EM receivers 25 are located on the seafloor 6. The receivers are sensitive to EM fields induced in their vicinity by the HED transmitter, and record signals indicative of these fields for later analysis. Each of the EM receivers 25 includes a data-logging unit 26, a pair of orthogonal antennae 24, a floatation device 28 and a releasable ballast weight (not shown).

In CSEM studies of hydrocarbon reservoirs, it is relevant to note that resistivity scales approximately linearly with gas and/or oil saturation Consequently, if the resistivity can be determined sufficiently accurately, the percentage saturation in the reservoir can in principle be determined. This has been understood, since at least 1994, when it was shown that quantitative determination of oil saturation percentages in a reservoir could be directly determined by CSEM to within a few tens of percent, taking account of the sensitivities and noise levels of the CSEM equipment available at that time, and also provided that the CSEM modelling included additional constraints, e.g. from well logs if available or seismic measurements of the same target volume (Hoerdt & Strack 1994).

A general review of CSEM as carried out on land, which generally uses time domain measurements, can be found in Strack 1992. A general review of marine CSEM, which generally uses frequency domain measurements, can be found in Constable & Weiss 2005 and references therein.

The joint processing of CSEM and seismic data, and in particular CSEM and AVO seismic data, is an area of current interest and a number of recent publications have occurred, such as Hoversten et al 2006, Harris & MacGregor 2006. The overall aim of these joint processing studies is to eliminate ambiguities that exist when processing only CSEM data or only AVO seismic data. Further publications on integration of seismic and electromagnetic measurements, including MT methods, can be found in Dell'Aversana 2006, Jegen 2006, De Stefano and Colombo 2006, Zhanxiang 2006 and Moser 2006.

In Harris & MacGregor 2006 it is described how rock physics relationships can be used to relate reservoir properties such as gas saturation and porosity to electrical and acoustic rock properties, such as resistivity and acoustic impedance. Examples of the models used include Archie's law and Waxman-Smits for relating porosity and resistivity, the Faust equation for relating P-wave velocity to resistivity, and in the seismic case the Hertz-Mindlin theory and Gassmann's equations to relate porosity and fluid saturation to P-wave velocity, S-wave velocity and density. Perturbations on reservoir properties are input to the model to see the effect on the elastic/acoustic properties.

SUMMARY OF THE INVENTION

This invention generally relates to methods of analysing the effects of variations in reservoir properties on seismic and CSEM data.

More particularly, according to a first aspect of the invention there is provided a method of characterising a hydrocarbon reservoir contained in a region of interest, comprising: obtaining a set of measured CSEM data of the region of interest; obtaining a set of measured seismic data of the region of interest; defining an earth model of the region of interest by setting values of a plurality of earth model parameters; defining a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity; setting values for the rock property parameters; computing a set of synthetic CSEM data of the region of interest with said values of the rock property parameters and using survey equipment parameters for a CSEM transmitter and CSEM receivers matched to those used when collecting said measured CSEM data; computing a set of synthetic seismic data of the region of interest with said values of the rock property parameters and using survey equipment parameters for a seismic transmitter and seismic receivers matched to those used when collecting said measured seismic data; and perturbing, preferably iteratively, the values of at least a subset of the rock property parameters in order to find a fit of the synthetic CSEM and seismic data to the measured CSEM and seismic data respectively, thereby to determine the hydrocarbon saturation level of the hydrocarbon reservoir.

The hydrocarbon saturation level may include as separate parameters an oil saturation level and/or a gas saturation level, so that in the step of perturbing the values of the rock property parameters it can be established whether the hydrocarbon reservoir is a gas reservoir or an oil reservoir, or a mixed gas/oil reservoir.

The method may further comprise: penetrating the hydrocarbon reservoir with a hydrocarbon-producing well; and extracting a volume of hydrocarbon from the hydrocarbon reservoir.

Moreover, these steps may be carried out conditionally depending on whether the measured hydrocarbon saturation level is sufficiently high to render the hydrocarbon reservoir commercially viable, for example above a threshold, such as 50%, 60%, 70%, 80% or 90%.

The invention also relates to a volume of hydrocarbon obtained by the extracting steps.

The seismic data may solely or partly consist of AVO data, where AVO data is used to include AVA data.

The method of the invention therefore builds on the disclosure of Harris & MacGregor 2006 by using a rock physics model which relates reservoir properties (including at least some of porosity, lithology, saturation, shaliness, thickness, caprock thickness, presence of thin resistors) to surface seismic AVO (or AVA) and surface CSEM data, where "surface" is used to mean not downhole, i.e. data obtained by transmitters and receivers positioned on or above the surface, which in a marine context means the seabed or above, and in a land context means on the surface of the earth or above, e.g. with an aerial survey. This allows one to determine how perturbations in the reservoir properties affect surface data This can be carried out by systematically changing the reservoir properties and examining the effect on the synthetic data This type of sensitivity analysis is standard for seismic data in isolation. It is also known to perturb resistivity, range and frequency during survey planning for CSEM. However, it is not known generally known to include the rock physics in the modelling, nor to use such a model in data interpretation/analysis.

The use of the same relationships, i.e. the same rock physics model and parameter values for synthesizing both seismic and CSEM data is important because the data are known to be sensitive to different properties. For example, CSEM data is insensitive to porosity, and seismic data is in some circumstances not very sensitive to saturation levels, or completely insensitive, depending on the target and the type of seismic study being carried out.

The method of the first aspect of the invention may be repeated at a later time, after significant depletion of the hydrocarbon reservoir, to re-determine the nature of the depletion, which may manifest itself through a reduction in the hydrocarbon saturation level and/or a reduction in vertical and/or lateral extent of the hydrocarbon reservoir. Namely, the method may further comprise: obtaining a further set of measured CSEM data of the region of interest and a further set of measured seismic data of the region of interest, wherein a significant volume of hydrocarbon has been extracted from the hydrocarbon reservoir during the time between obtaining the original and further sets of measured data; applying the method of the first aspect of the invention to the further sets of measured CSEM and seismic data using substantially the same earth model and rock physics model, and perturbing substantially only the values of the water and hydrocarbon saturation levels in the hydrocarbon reservoir and/or extent of the hydrocarbon reservoir in the earth model in order to find a fit of the further synthetic CSEM and seismic data to the further measured CSEM and seismic data respectively, and determining the effect of extraction on the reservoir by comparing changes between the saturation levels and/or extent of the hydrocarbon reservoir between said original and said further measurements.

The result of this analysis may be used to extract further volumes of hydrocarbon from the hydrocarbon reservoir at a reduced rate taking account of the determined reduction in the hydrocarbon saturation level.

The result of this analysis may be used to penetrate the hydrocarbon reservoir with a further hydrocarbon-producing well at a location taking account of the determined extent of the hydrocarbon reservoir.

According to a second aspect of the invention there is provided a method of planning a survey of a region of interest that is known to, or may possibly, include one or more reservoirs, which may or may not be hydrocarbon bearing, the method comprising: defining an earth model of the region of interest by setting values for a plurality of earth model parameters; defining a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity; defining a set of survey equipment parameters defining CSEM and seismic transmitter and receiver properties; setting at least two different values of at least one of the rock property parameters to postulate different possible scenarios for a potential reservoir; setting singular values for the other rock property parameters and the survey equipment parameters; computing sets of synthetic CSEM and seismic data of the region of interest with said values; and establishing whether the different possible scenarios are distinguishable in the synthetic CSEM and seismic data, and if yes, using those survey equipment parameters to define a future survey.

The method may further comprise: perturbing the survey equipment parameters to maximise distinguishability of the different possible scenarios in the synthetic CSEM and seismic data, and using those survey equipment parameters to define a future survey.

The method preferably takes account of known receiver signal levels and noise levels when establishing whether the different possible scenarios will be distinguishable in measured data.

The distinguishability may relate to the detectability of hydrocarbon saturation levels in the hydrocarbon reservoir, and in particular if it can be established whether the reservoir has sufficiently high saturation levels to be commercially viable, for example if the saturation levels can be distinguished within a range of saturation levels of 10%, 20%, 30% or 40%.

Said at least one of the rock property parameters which is varied to postulate the effect on collected data of different possible scenarios is water saturation level and hydrocarbon saturation level.

The synthetic seismic data preferably includes AVO data.

The invention also relates to a method of performing a joint CSEM and seismic survey of a region of interest using values of survey equipment parameters obtained from the above planning method.

Further aspects of the invention relate to a computer program product bearing machine executable instructions for implementing the above methods of characterizing a hydrocarbon reservoir and planning a survey, as well as a computer apparatus loaded with machine executable instructions for implementing such methods.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

For a better understanding of the invention and to show how the same may be carried into effect reference is now made by way of example to the accompanying drawings.

DETAILED DESCRIPTION

An embodiment of the invention relates to a method of characterising a hydrocarbon reservoir contained in a subterranean region of interest on land or beneath the seabed.

Figure 1A:
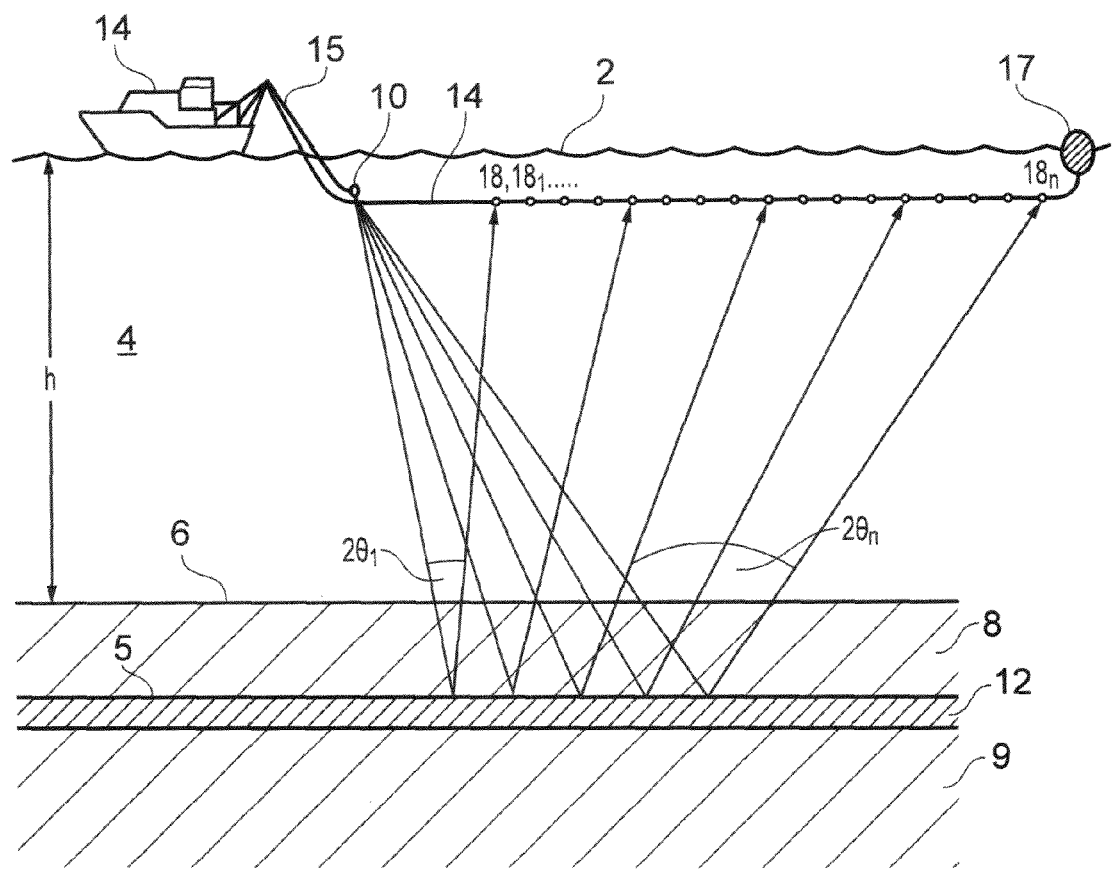
FIG. 1A schematically shows a typical AVO survey carried out in a marine environment.
Figure 1B:
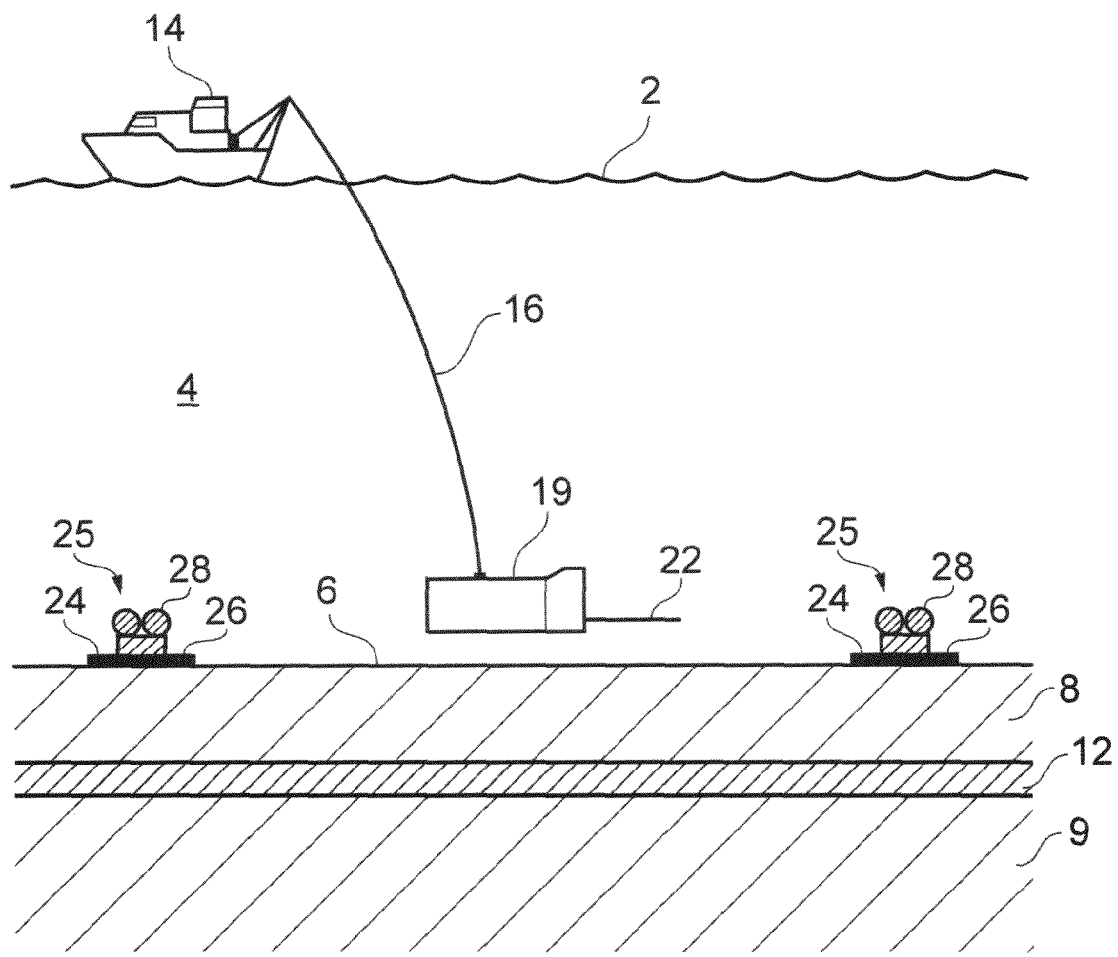
FIG. 1B schematically shows a typical CSEM survey carried out in a marine environment.

The method presupposes that a set of measured CSEM data and a set of measured seismic data is available for the region of interest. These data may be collected as known in the literature and as illustrated schematically in the above-described FIGS. 1A and 1B. As is known in the art the complimentary CSEM and seismic data sets may be collected simultaneously or one after the other depending on the equipment available.

The data processing involves the following main steps.
1. Create a model of the earth An earth model of the region of interest is defined by setting values of a plurality of earth model parameters. This is done using data about a particular reservoir obtained from previous surveys of any kind (including without limitation CSEM, seismic, magnetic, magneto-telluric) and preferably also well log data. The model consists of various parameters for reservoir properties, including position, porosity, lithology, saturation, shaliness, thickness, caprock thickness, and the presence of thin resistors.
2. Define a rock physics model. The rock physics model is made up of a number of interdependent relations linking rock property parameters of the region of interest (including porosity, elasticity moduli, water saturation level and hydrocarbon saturation level) with elastic and electrical parameters of the region of interest (including P-wave velocity, S-wave velocity and electrical conductivity). Rock physics models which relate rock and fluid properties to elastic and electrical properties are selected from equations proposed in the literature, for example in Mavko et al 2003 which includes many different relations and models which are suitable for particular targets. For example, the Biot-Gassmann equations can be used, which relate bulk modulus and shear modulus (and thus seismic velocity) to fluid content. Archie's Law can also be used, which relates resistivity to porosity and saturation for clean sands, and the Simandoux model which relates the same properties but with a correction term for clay minerals. Other examples of rock physics relationships that could be used include the Indonesia formula, the Waxman-Smits equations and its variations. Any of a variety of models could be selected, and the geoscientist will select which ones are most appropriate for the geology in question. Part of the selection process is a calibration using available data for the region of interest, or neighbouring regions, or other regions thought or known to have similar geology. Existing well log data is likely to be particularly useful. The calibration allows the selection of particular rock physics relations which suit the data acquired from the well logs or other available data. Without available well log data, the method may not function reliably. Some specific examples of suitable rock physics models are given below.
3. Modelling surface data. The next step is to compute surface seismic and CSEM data from the model and rock physics relationships. At this point there is a model of the earth, and a rock physics model specifying relationships between the reservoir properties and the elastic/electrical properties have been chosen.
4. Computation of synthetic data is then performed. The synthetic data includes a seismic data set and a CSEM data set. Namely, a set of synthetic CSEM data of the region of interest is calculated with the chosen values of the rock property parameters and using survey equipment parameters for a CSEM transmitter and CSEM receivers matched to those used when collecting the earlier measured CSEM data Similarly, a set of synthetic seismic data of the region of interest is calculated with said values of the rock property parameters and using survey equipment parameters for a seismic transmitter and seismic receivers matched to those used when collecting said measured seismic data.
5. Perturbing a reservoir property. More synthetic data are computed using a different starting model with a perturbed reservoir property. The same determined relationship between the reservoir properties and the surface data are used in the calculation of this second synthetic data set. For example, the synthetic data can bee remodelled by changing the postulated hydrocarbon from gas to oil, or by changing the postulated saturation level. In practice, this is repeated iteratively for perturbations of different reservoir properties and the synthetic data re-calculated for multiple different models. For a full feasibility study, it is necessary to include a number of different reservoir properties and include their rock physics descriptions in the perturbations.

By this method it is possible to determine, or at least predict, parameters such as the hydrocarbon saturation level of the hydrocarbon reservoir, the content of the reservoir (e.g. water, gas, oil).

Example Rock Physics Model

Before describing the specific example, it is noted that the general objective when defining a suitable rock physics model for the region of interest is to find a set of equations relating the elastic properties, bulk modulus (K), shear modulus ($\mu$), bulk density ($\rho$), and the electrical properties, conductivity ($\sigma$), on the one hand, to the rock properties of primary interest on the other; particularly porosity ($\phi$), water, gas and oil saturations ($S_w$, $S_g$, $S_o$), clay mineral content ($V_{clay}$). To achieve this other properties of the constituent minerals and fluids are also required. Typically such properties are obtained by analysing well logs and by using known properties from published tables.

In one example, the elastic and electrical properties are calculated with various different porosity values. For this case, the cemented sand model was chosen using quartz properties for the sand grains and average clay mineral properties for the cement. The cemented sand model is described further below. Varying the porosity then amounts to varying the amount of clay in the pore space, keeping the amount of quartz fixed. The equations to calculate the effective bulk and shear moduli are given below, from Mavko et al 2003. We used "Scheme 1" as described on page 155 thereof. Note that the notation there is slightly different from that used in this document, in particular they use G for shear modulus where in this document $\mu$ is used.

The clay content and porosity are related in this model, by $$V_{clay} = \phi_{sand} - \phi$$

The model requires the bulk and shear moduli of both the grains and the cement. These values are obtained from tables of experimental measurements. The coordination number is determined by fitting the model to a depth interval containing clean sand in the well logs.

Having obtained the dry frame bulk and shear moduli as above, we use Gassmann's relations to obtain the effective elastic properties of the rock containing fluid.

$$\frac{K_{sat}}{K_0 - K_{sat}} = \frac{K_{dry}}{K_0 - K_{dry}} + \frac{K_{fluid}}{\varphi(K_0 - K_{fluid})}$$

$$\mu_{sat} = \mu_{dry}$$

In these equations the subscript 0 refers to the pure mineral properties whereas dry refers to the rock frame. The fluid properties are determined from standard equations relating them to temperature, pressure, and gas-oil ratio, all of which are known for a given well.

The bulk density is obtained by simple averaging of the rock constituents:

$$\rho = V_{sand}\rho_{sand} + V_{clay}\rho_{clay} + \phi\rho_{fluid}$$

The mineral densities are known from published tables.

Once we have the bulk and shear moduli and density of the fluid-saturated rock, the P wave velocity, $\alpha$, and the S wave velocity, $\beta$, are readily calculated by $$\alpha = \sqrt{\frac{K + 4\mu/3}{\rho}}$$

and $$\beta = \sqrt{\frac{\mu}{\rho}}$$

Finally the electrical conductivity is modelled by the Simandoux equation:

$$\sigma = \frac{\sigma_{water}(\varphi S_w)^m}{a} + \sigma_{clay} V_{clay}$$

Here a and m are empirical constants determined by fitting a curve to well log measurements in the formation of interest. The clay conductivity is estimated from a section of well log where there are pure shales.

The example above applies to a quartz sand-shale mixture. Normally there are also other minerals present. All of these equations are routinely modified to account for the presence of other minerals. In addition, equations such as the cemented sand model and the Simandoux equation may not provide the best prediction in a given well or for some rock types, and we routinely evaluate several different rock physics models to determine which is best in a given well for a particular lithology.

The cemented sand model used and referred to above is now described. It is assumed that the starting framework of cemented sand is a dense, random pack of identical spheres with porosity $\phi_{sand} \approx 0.36$ and average number of contacts per grain C=9.

The effective dry-rock bulk and shear moduli when cement is added are $$K_{dry} = \frac{1}{6} C(1 - \varphi_{sand}) M_{cement} \hat{S}_n$$

and $$\mu_{dry} = \frac{3}{5} K_{dry} + \frac{3}{20} C(1 - \varphi_{sand}) \mu_{cement} \hat{S}_\tau$$

$$M_{cement} = K_{cement} + \frac{4}{3}\mu_{cement}$$

The parameters $S_n$ and $S_\tau$ are proportional to the normal and shear stiffnesses respectively:

$$\hat{S}_n = A_n \alpha^2 + B_n \alpha + C_n$$

$$A_n = -0.024153 \Lambda_n^{-1.3646}$$

$$B_n = 0.020405 \Lambda_n^{-0.89008}$$

$$C_n = 0.00024649 \Lambda_n^{-1.9864}$$

$$\Lambda_n = \frac{2\mu_{cement}}{\pi\mu_{sand}} \frac{(1 - v_{sand})(1 - v_{cement})}{(1 - 2v_{cement})}$$

$$\hat{S}_\tau = A_\tau \alpha^2 + B_\tau \alpha + C_\tau$$

$$A_\tau = -10^{-2}(2.26 v^2 + 2.07 v + 2.3) \Lambda_\tau^{0.079 v^2 + 0.1754 v - 1.342}$$

$$B_\tau = (0.0573 v^2 + 0.0937 v + 0.202) \Lambda_\tau^{0.0274 v^2 + 0.0529 v - 0.8765}$$

$$C_\tau = -10^{-4}(9.654 v^2 + 4.945 v + 3.1) \Lambda_\tau^{0.001867 v^2 + 0.4011 v - 1.8186}$$

$$\Lambda_\tau = \frac{\mu_{cement}}{\pi\mu_{sand}}$$

and under scheme 1, $$\alpha = 2\left[\frac{\varphi_{sand} - \varphi}{3C(1 - \varphi_{sand})}\right]^{1/4}$$

Poisson's ratio, $v$, is related to bulk and shear modulus by $$v = \frac{3K - 2\mu}{2(3K + \mu)}$$

In the equations for $A_\tau$, $B_\tau$ and $C_\tau$ the subscript sand has been dropped for clarity.

We often find it necessary to increase the value of the coordination number, C above the theoretical value of 9. This allows a better approximation where the assumption of identical, spherical grains fails.

Case Study 1

The invention is exemplified using a case study from the Luva gas discovery, which lies on the Nyk High in the Voring Basin of the Norwegian Sea. The water depth in the area is 1274 m. Well 6707/10-1 encountered gas in an interval approximately 150 m thick at a depth of 1680 m below the seafloor. In this example, we use electric and elastic models constructed from the well log data to examine the sensitivity of both data types to hydrocarbon properties.

As a starting point we calculate the seismic and CSEM response to a baseline water saturated case, using Biot-Gassman to compute the seismic velocity changes, and calculating the electrical resistivity changes for clean sand and shaly cases using Archie and Simandoux models respectively (Mavko et al 2003).

Figure 2:
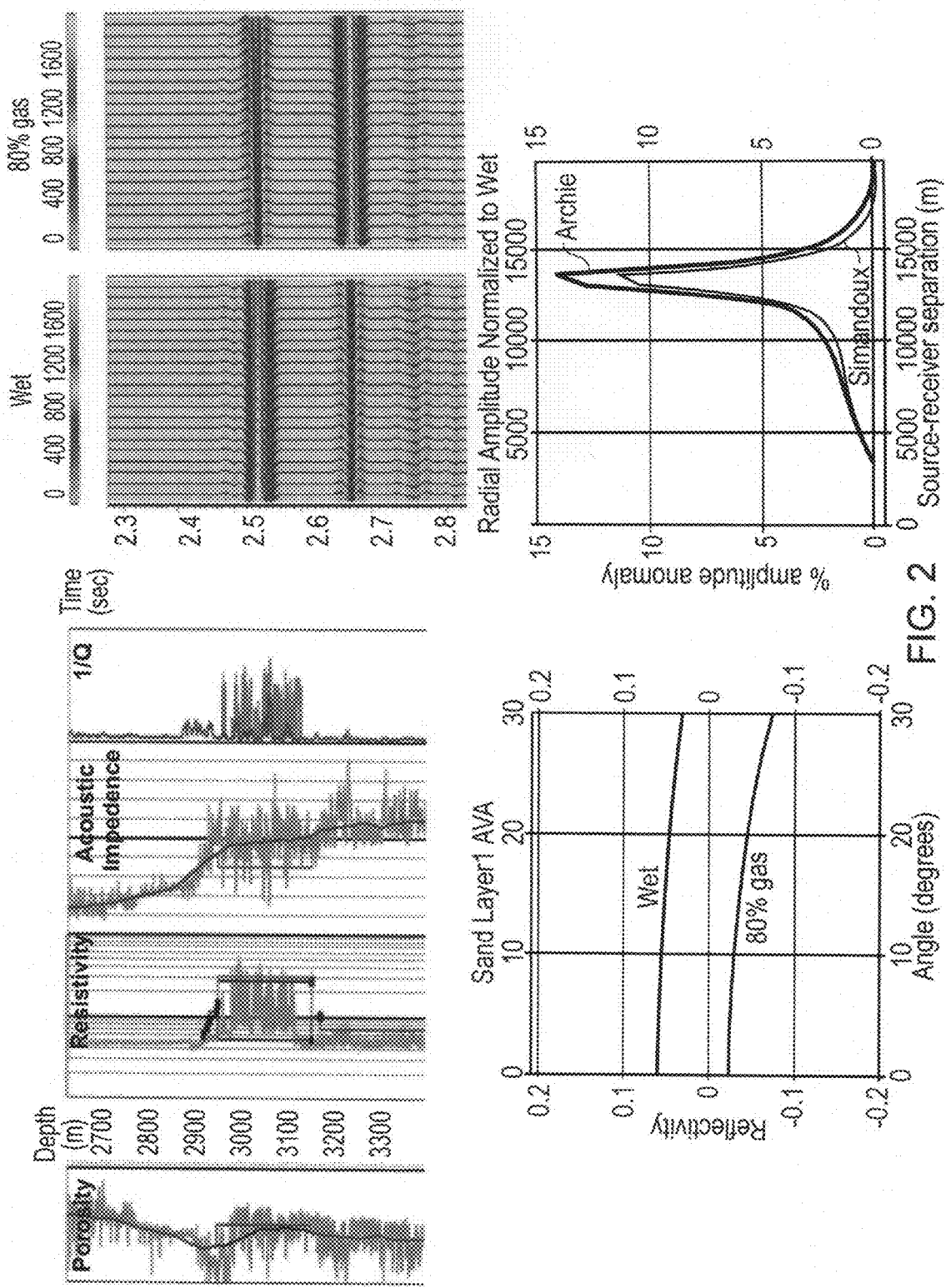
FIG. 2 shows results for a postulated 80% gas saturation on the seismic and CSEM response. The porosity is 26%. The top left part illustrates well logs from the Luva gas discovery. These were used to construct electric and elastic models of the reservoir. The top right part shows synthetic seismic gathers which show a strong difference between the wet and gas saturated cases (orange colours indicate a positive amplitude, blue colours a negative. The bottom left part shows reflectivity versus angle of incidence for the wet case (blue line) and gas saturated case (red line). The bottom right part shows the normalised CSEM anomaly, showing the difference in response between the wet and gas saturated cases. The transmission frequency is 1 Hz. Note that the inclusion of shale in the model alters the measured response.

FIG. 2 shows the CSEM anomaly (calculated as the difference between the amplitude response between the gas saturated and wet reservoir) and seismic response for the case of a postulated 80% gas saturation level, which is consistent with the average in-situ gas saturation in the reservoir. The presence of the gas results in a significant negative amplitude anomaly (in contrast to a positive anomaly in the wet case) in synthetic gathers. In the CSEM anomaly we see a large increase in the strength of the measured signal resulting from the reservoir.

Figure 3:
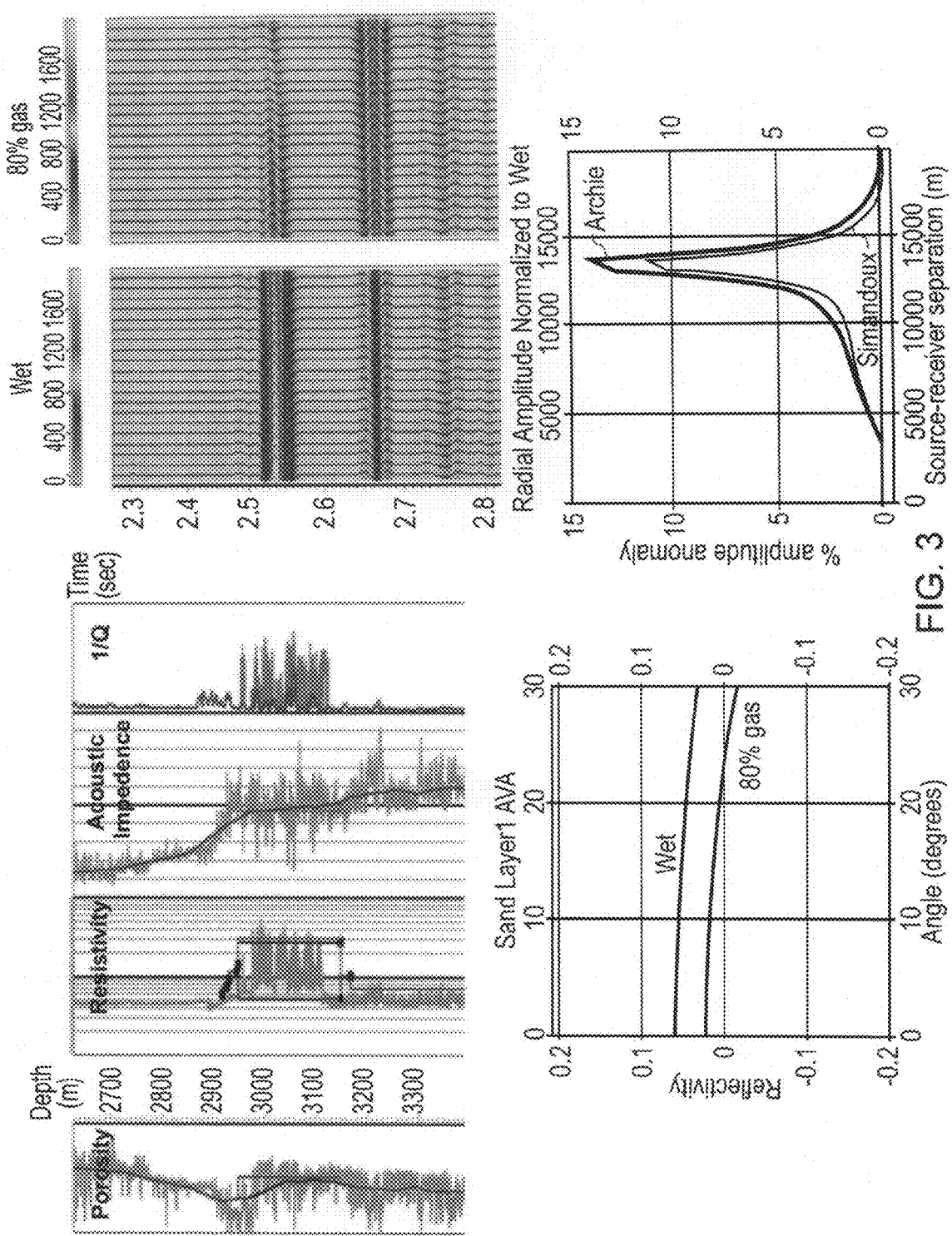
FIG. 3 shows results for a postulated 80% oil saturation on the seismic and CSEM response. The porosity is 26%. The various parts of the figure correspond to those of FIG. 2. The CSEM response from the oil saturated reservoir is similar to that from a gas saturated reservoir, but the seismic response distinguishes the hydrocarbon type in the reservoir.

FIG. 3 shows the effect of hydrocarbon type on the seismic and CSEM response. Here we replace the gas in the reservoir with oil. In this case the CSEM anomaly is large, as in the gas saturated case, which is to be expected since both gas and oil produce an increase in the bulk resistivity of the reservoir. The CSEM data can map this high resistivity, but are not sensitive to the difference between gas and oil. However, because gas and oil have significantly different acoustic properties, the seismic response is significantly different. In this example, by combining the results of seismic and CSEM surveys in the data processing using a common rock physics model we can differentiate between different hydrocarbon types.

Although the CSEM technique can determine the presence of a high resistivity zone, which may indicate the presence of hydrocarbons, it cannot distinguish between gas and oil. Here the seismic data, integrated in the interpretation can provide this information.

Case Study 2

This case study is also based on the Luva discovery. The first step in modeling is to compute the seismic AVA and 1D CSEM responses at in-situ and 100% water saturated conditions. If these models show substantial differences between gas and wet cases, then we have an important indication that hydrocarbon detection is feasible. The average in-situ gas saturation in the pay sand is about 85%, so our initial model will represent the 85% Sg case.

Figure 4:
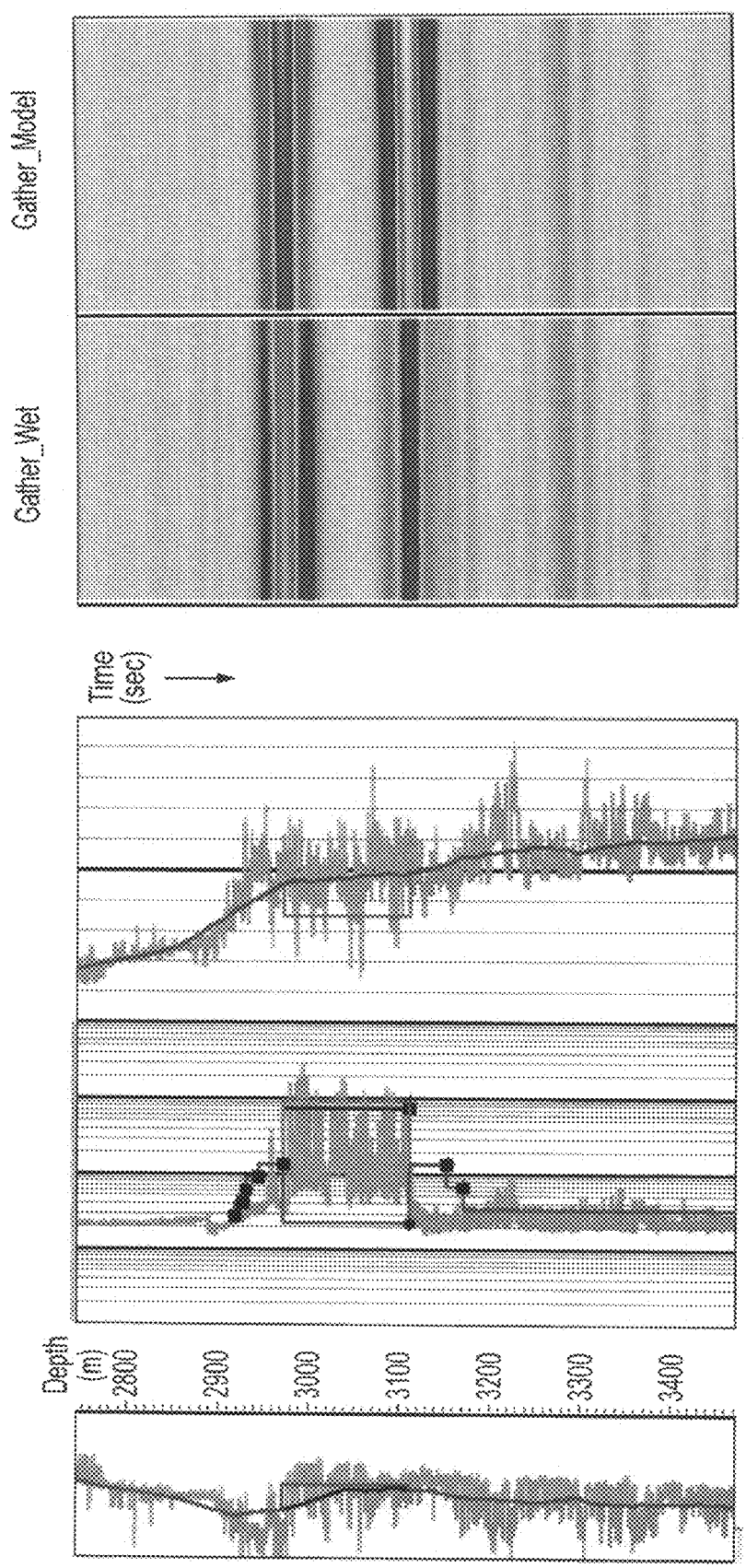
FIG. 4 shows synthetic seismic gathers for a postulated wet reservoir (left) and 85% gas saturated reservoir (right). Orange colors in the gather indicate positive amplitude (low AI over high AI), blue color indicates negative amplitude (high AI over low AI).

FIG. 4 shows there is a substantial difference between the wet and 85% gas synthetic gathers. In the wet case, the top of the sand has positive amplitude (high impedance) but in the gas case, we see negative amplitude (low impedance) assuming the USA polarity standard. We used Biot-Gassmann to compute the seismic velocity changes. Electrical resistivity changes were computed for clean sand and shaly sand cases using Archie and Simandoux, models respectively (Mavko, et al, 1998). Seismic gathers were computed using a 30 Hz Ricker wavelet and the CSEM frequency was 1 Hz.

Figure 5:
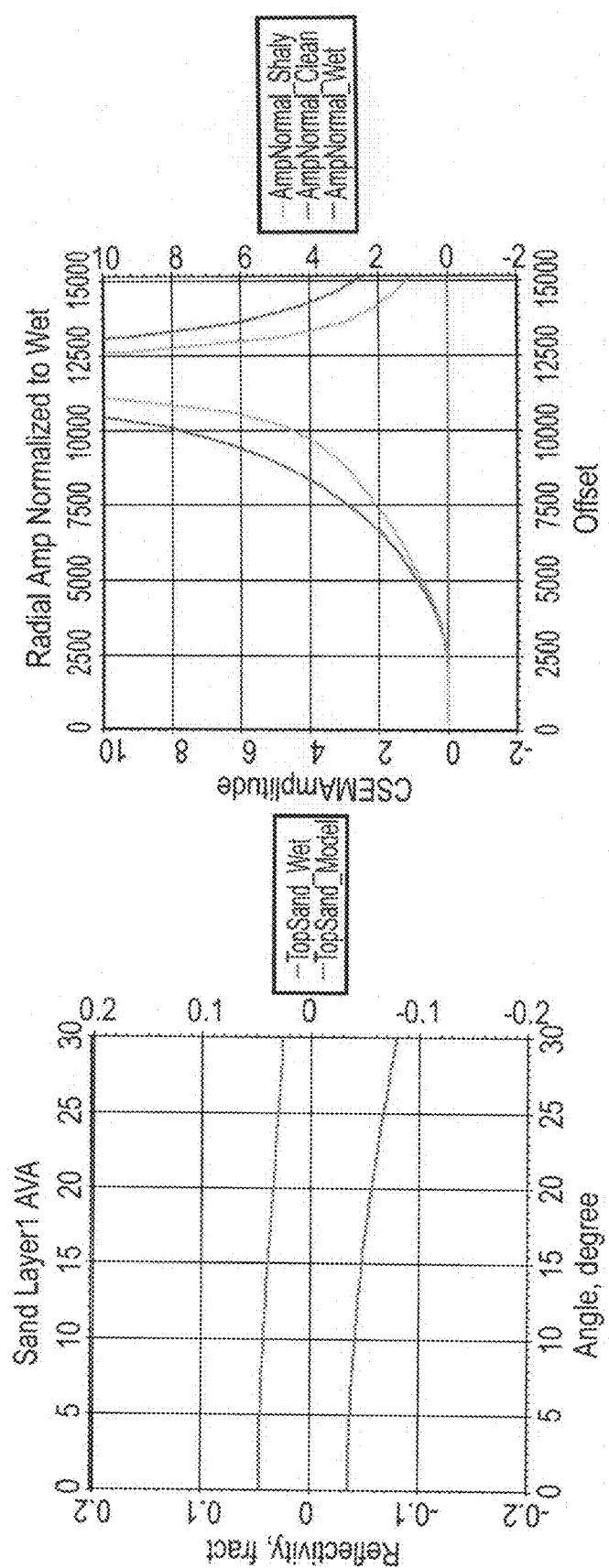
FIG. 5 shows, in the left part, reflectivity versus angle of incidence for a wet reservoir (blue line) and an 85% gas saturated reservoir (red line), and, in the right part, normalized radial CSEM amplitude versus source-receiver distance for a wet reservoir (base case) and an 85% gas saturated reservoir. Note that the difference in CSEM amplitude between the wet and gas case ranges from a factor of 5 for shaly sand (orange line) to a factor of 8 for clean sand (red line) at the maximum spacing of 10000 meters.

FIG. 5 shows the relative effects of high gas saturation (85%) for both the seismic AVA method and the CSEM method. Note that for seismic response we see a change in reflectivity polarity when water is replaced by gas in the reservoir. The CSEM plot shows substantially higher amplitude for the gas case at about 10000 meters total offset. This is about the limit of the measurement capability as the signal drops below the $10^{-15}$ V/(A*m$^2$) noise floor at around 10000 meters offset.

Figure 6:
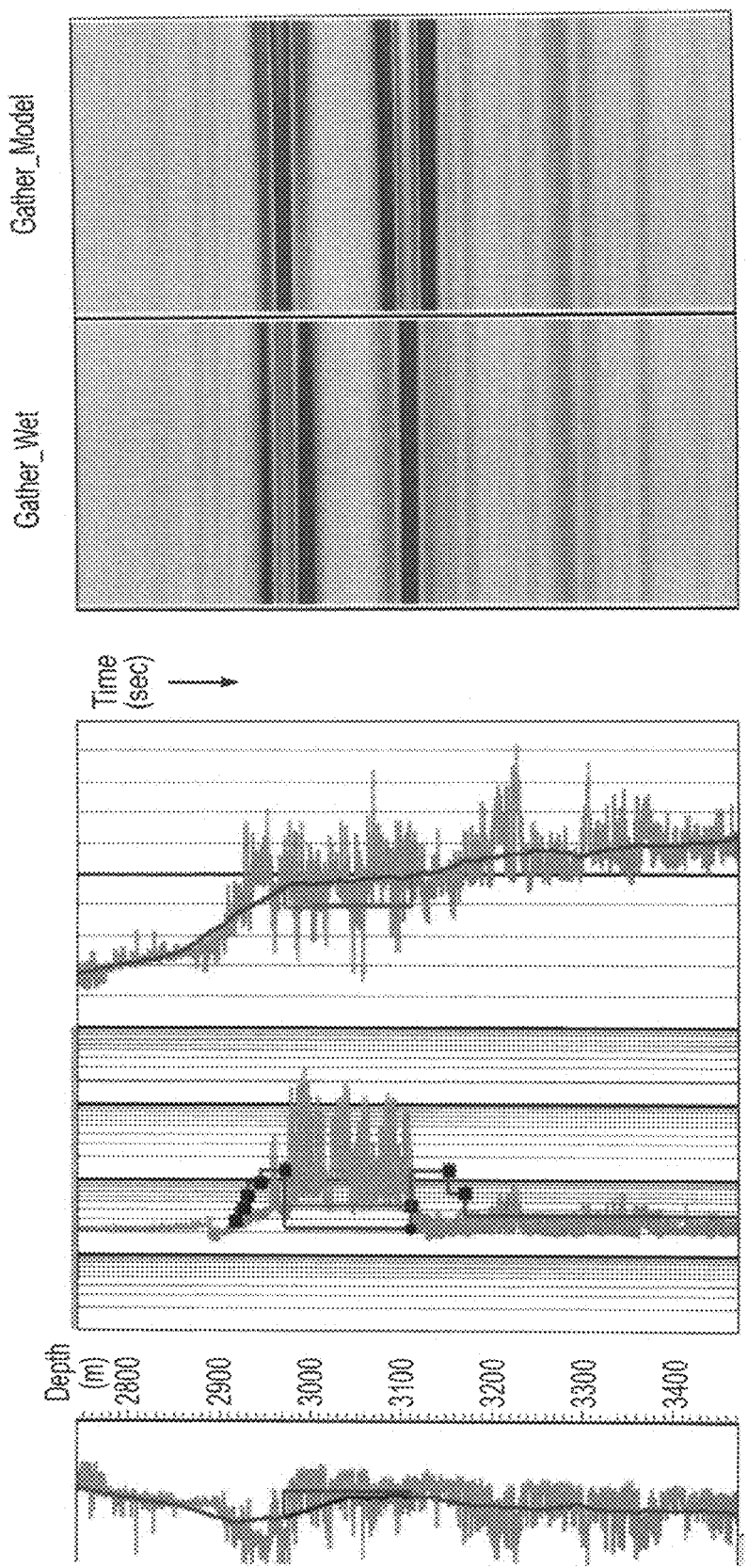
FIG. 6 shows synthetic seismic gathers, which show strong amplitude difference between the wet case (left) and the non-commercial 30% gas case (right).

FIG. 6, which is to be compared with FIG. 4, shows the synthetic seismic gathers for the wet case and the 30% gas case.

Figure 7:
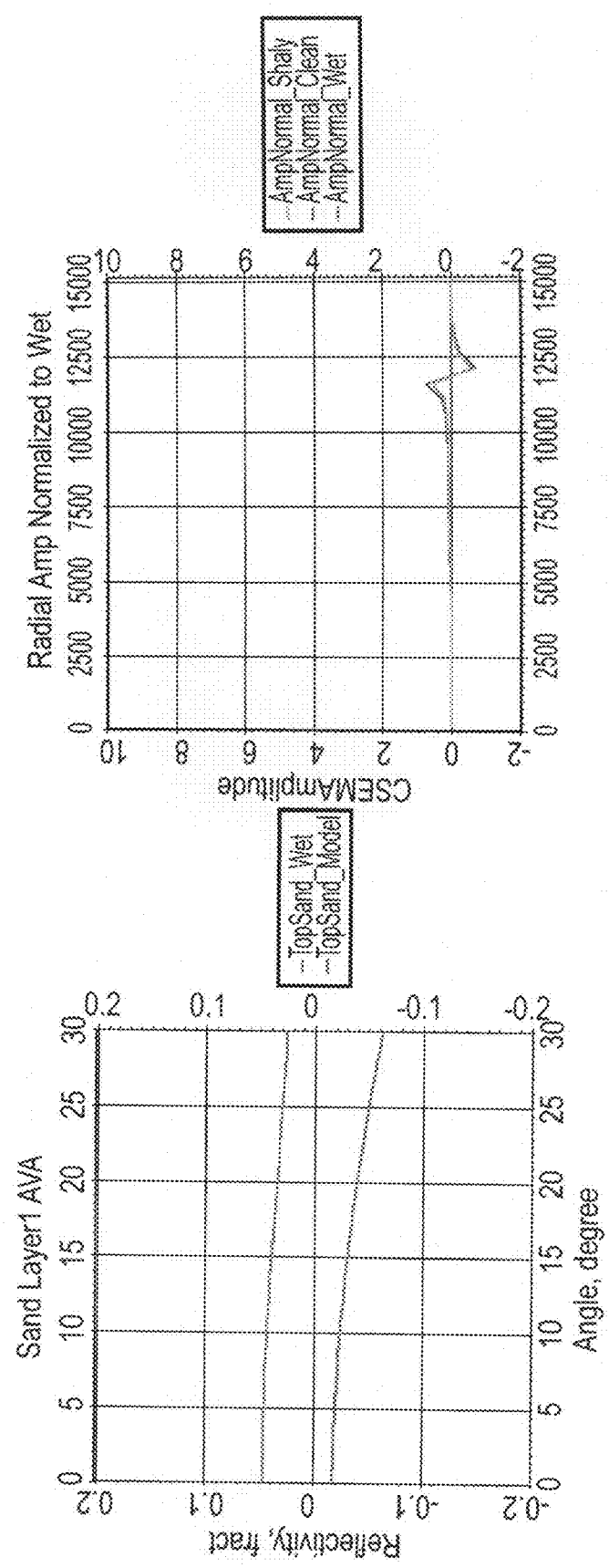
FIG. 7 shows, in the left part, reflectivity versus angle of incidence for wet (blue line) and 85% gas case (red line), and, in the right part, the natural log of normalized radial CSEM amplitude versus source-receiver distance for the wet and 30% gas cases.

FIG. 7, which is to be compared with FIG. 5, shows the relative effects of high gas saturation (85%) for both the seismic AVA method and the CSEM method.

In FIG. 6, the non-commercial 30% gas case on the right is almost identical to the 85% gas case gather in FIG. 4. In FIG. 7, the seismic AVA crossplot on the left side shows that the effect of 30% gas is about the same as the effect of 85% gas shown in FIG. 5. However, the CSEM data (right side of FIG. 7) for 30% gas exhibits a very substantial difference from the 85% gas case in FIG. 5.

Based on these models, we conclude that pre-stack seismic gathers alone cannot discriminate low gas saturation from high gas saturation in this case. However, if CSEM data is available at this location, then we have a very sensitive indication of the commercial versus non-commercial gas concentration.

To summarize, we have used established rock physics principles to model the relative effects of high gas saturation and low gas saturation on both seismic AVA and CSEM amplitude. While high gas saturation is clearly discriminated from 100% water saturation by both seismic and CSEM methods, the non-commercial low gas saturation case (30% gas) can only be diagnosed by CSEM. Seismic AVA modeling shows that the non-commercial 30% gas case and the commercial 85% gas case are virtually identical. But when CSEM response is considered, there is a large difference between the 85% gas and 30% gas saturation response. This difference is large whether one assumes that the sand is clean or shaly.

Applications

The invention may be used in a number of different applications and several examples are now given.

The method of the invention may be used as an interpretation tool. The geoscientist may already have real survey data (e.g. seismic, CSEM and other) but there will be some ambiguities in the interpretation, for example in the specific location of a reservoir boundary. The synthetic data calculated using the method of the invention may help resolve the ambiguities.

The method of the invention may be used for a survey feasibility study. Here, rock physics relationships between a variety of reservoir properties and elastic/electric properties are included, and are used to model the surface response. Systematic perturbation of reservoir properties allows an understanding to be built up of whether seismic and/or CSEM surveys are likely to be sensitive to the conditions in the reservoir, and are likely to yield useful information which help map the reservoir.

The method of the invention may be used for survey planning. Here, synthetic data would be calculated in the manner described above for a particular reservoir model and survey parameters, such as transmitter type, transmitter frequency, or transmitter and receiver geometry. By transmitter type we mean for a CSEM survey whether the transmitter is horizontal or vertical electric dipole or some other type. By survey geometry we mean the geometric parameters that define each survey, such as transmitter and receiver positions and alignments. A survey will have particular objectives, i.e. measuring certain properties over a certain range. The method of the invention allows perturbation of the value of a relevant reservoir property, and calculation of a second synthetic data set with the perturbation. The respective synthetic data sets obtained with the non-perturbed and perturbed values can be compared to establish whether the survey geometry will allow the survey objectives to be met. If the response is predicted to be inadequate either in absolute terms or in terms of the difference between the respective synthetic data sets, then survey parameters can be adjusted and the synthetic data recalculated until the survey is predicted to give useful results, e.g. in terms of being able to distinguish between two postulated scenarios for the reservoir. This kind of survey planning activity is already carried out on CSEM methods. For example, synthetic data may be calculated, and a resistivity value may be perturbed to create a second synthetic data set. Using the new methodology, the values for the fluid properties can be perturbed directly, with the calculations made through to the synthetic surface data to indicate the likely response of the CSEM and seismic surveys.

The method of the invention may be used for feasibility models for inversions. For example, it may be desired to invert a measured data set for a particular reservoir property. Synthetic data can be computed from the models and compared with the measured data. This allows an assessment of whether the measured data carries enough information to be able to invert reliably for the reservoir property. It may not if the inversion only produces correlations between different parameters, e.g. rather than deriving a particular parameter, the inversion only produces a linear combination of two parameters.

The method of the invention may be used for providing reliable inputs for an inversion. The following is an example for a posterior probabilistic inversion (or stochastic inversion): Provide probability density functions of reservoir properties. Sample from those probability density functions to generate possible models of reservoirs. These are combinations of various reservoir properties that are synthetic descriptions of reservoirs. Use the models in the process as outlined above to calculate synthetic data, using rock physics relationships and the forward modelling of the surface seismic and CSEM data. The calculation of this synthetic data is carried out many times for many different models. The synthetic data is then compared to measured CSEM and seismic data. A misfit gives information about the quality of the generated model, and this allows an update of the probabilities associated with that model.

The method of the invention may be used for improving inversion efficiency. The methodology allows reduction to the number of times synthetic data are recalculated. For example, a feasibility/sensitivity study may demonstrate that perturbing one particular reservoir property will not create a significant change in synthetic surface data. This being the case, perturbing that reservoir property can be eliminated from an inversion algorithm, cutting down significantly on perturbations and forward calculations carried out.

The method of the invention may be used for hypothesis testing. Seismic and/or CSEM data may comprise another anomaly in a geodetic position away from the well which may indicate another prospect, i.e. another hydrocarbon reservoir. However, there are a number of different scenarios which could give rise to the anomaly. For example, the method allows various properties to be perturbed to match a particular scenario. The synthetic data can be remodelled and compared with the measured surface data. If there is a misfit, the scenario can be ruled out. The remaining models could be used as starting models for an inversion process.

It will be appreciated that the method of the invention has practical uses in that the results of the data processing can be used to recover hydrocarbon reserves through appropriate well drilling and to recover hydrocarbon reserves more efficiently through management of extraction from existing wells.

Figure 8:
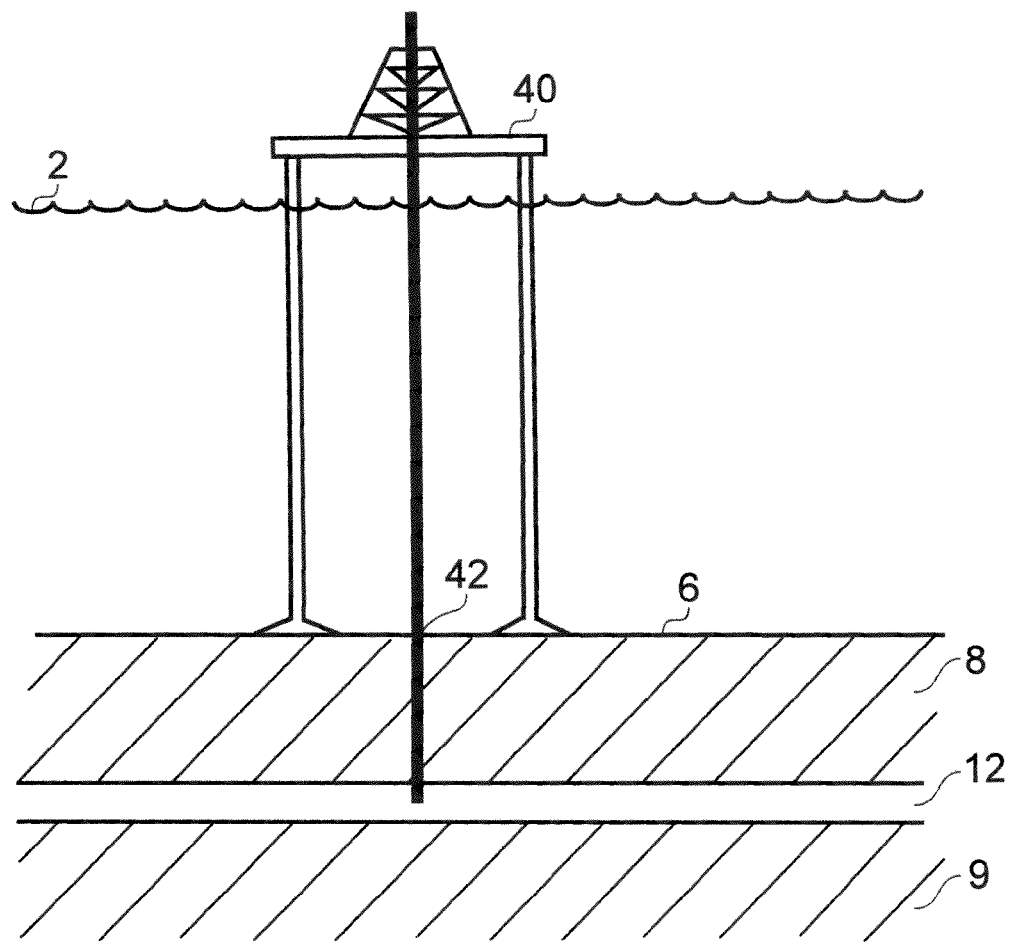
FIG. 8 is a schematic view of an oil rig producing hydrocarbon according to an embodiment of the invention.

FIG. 8 is a schematic view of an oil rig 40 producing hydrocarbon according to an embodiment of the invention. The oil rig is located in the vicinity of a region of interest 40 which has been surveyed, and the resulting data sets analysed, according to the above described methods. It is assumed here that the results of the analysis have identified a subterranean hydrocarbon reservoir 12 within the region of interest. The identified hydrocarbon reservoir has been penetrated by a hydrocarbon-producing well 42 carried by the oil rig 40. Hydrocarbon (e.g. oil) may be produced from the well 42 (i.e. extracted/recovered from the reservoir 12) using conventional techniques.

Figure 9:
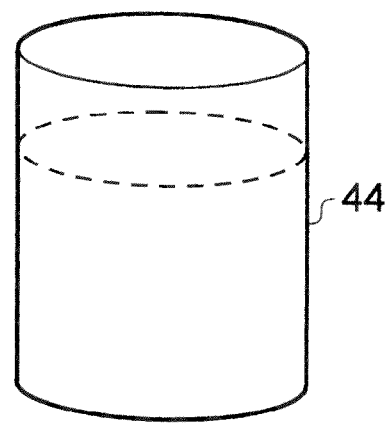
FIG. 9 is a schematic perspective view of a barrel containing a volume of hydrocarbon according to an embodiment of the invention.

FIG. 9 is a schematic perspective view of a barrel containing a volume of hydrocarbon 44 according to an embodiment of the invention. The hydrocarbon is produced using the well 42 shown in FIG. 12.

Figure 10:
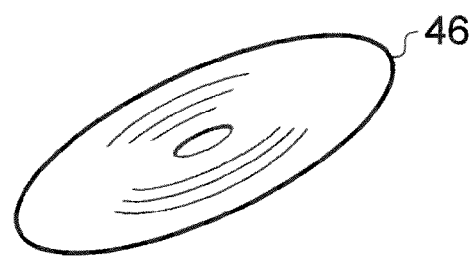
FIG. 10 is a schematic perspective view of a data storage medium bearing a data set according to an embodiment of the invention.

FIG. 10 is a schematic perspective view of a data storage medium 46 bearing a data set according to an embodiment of the invention. The data storage medium in this example is a conventional optical disc, e.g. a data compact disc or data DVD disc. Any other storage medium may equally be used. Thus data sets obtained according to embodiments of the invention, e.g. the above described on-target and/or off-target survey data sets, may be stored on the data storage medium 46 for later analysis.

It will be understood that marine uses of the invention are not confined to seawater, but may also be practiced in freshwater, for example large lakes or estuaries, so that references to seafloor, seawater etc. should not be regarded as limiting and should be interpreted as covering lakebed, riverbed etc.

It will be further understood that the invention may also be practiced on land using land seismic and CSEM data.

REFERENCES

Constable and Weiss 2005: *Mapping thin resistors and hydrocarbons with marine EM methods: Insights from 1D modeling*, Geophysics, vol. 71, No. 2, pages G43-51

Dell'Aversana 2006: Dell'Aversana, Paolo, *Combined electromagnetic, gravity and seismic methods: the added value of integration*, pages 3-4, Integration of Seismic and Electromagnetic Measurements Workshop, SEG International Exhibition and 76th Annual Meeting, 1-6 Oct. 2006, New Orleans, United States of America De Stefano and Colombo 2006: De Stefano, Michele and Colombo, Daniele, *Geophysical modeling through simultaneous Joint Inversion of Seismic, Gravity and Magnetotelluric Data*, pages 8-11, Integration of Seismic and Electromagnetic Measurements Workshop, SEG International Exhibition and 76th Annual Meeting, 1-6 Oct. 2006, New Orleans, United States of America Harris and MacGregor 2006: Harris, Peter and MacGregor, Lucy, *Determination of reservoir properties from the integration of CSEM and seismic data*, First Break, vol. 24, pages 15-21, November 2006

Hoerdt and Strack 1994: Hoerdt, Andreas and Strack, Kurt, *Reservoir surveying through the combined use of seismic and electromagnetic methods*, 14th Mintrop Seminar, Arnsberg-Neheim, Germany, 3-6 May 1994

Hoversten et al 2006: Hoversten, M., F. Cassassuce, E. Gasperikova, G. Newman, J. Chen, Y. Rubin, Z. Hou, and D. Vasco (2006), *Direct reservoir parameter estimation using joint inversion of marine seismic AVA and CSEM data*: Geophysics, Vol. 71, No 3, pages C1-C13

Jegen 2006: Jegen, Marion, Strategies for Joint Inversion of Geophysical Data, pages 4-5, Integration of Seismic and Electromagnetic Measurements Workshop, SEG International Exhibition and 76th Annual Meeting, 1-6 Oct. 2006, New Orleans, United States of America MacGregor and Harris 2006: MacGregor, Lucy and Harris, Peter, *Remote determination of reservoir properties from joint interpretations of electromagnetic, seismic and well log data*, pages 6-7, Integration of Seismic and Electromagnetic Measurements Workshop, SEG International Exhibition and 76th Annual Meeting, 1-6 Oct. 2006, New Orleans, United States of America MacGregor and Harris 2007: MacGregor, Lucy and Harris, Peter, *Marine CSEM Sounding: Moving Beyond the Image*, EGM 2007 International Workshop, Capri, Italy, 15-18 Apr. 2007

Mavko et al 2003, *The Rock Physics Handbook*, Mavko, Mukerji, Dvorkin; Cambridge University Press, 2003; ISBN 0 521 54344 4

Moser et al 2006: Moser, Jochen; Adejonwo, Abayomi; Poupon, Manuel; Meyer Hans-Jurg; Wojcik, Chris; and Rosenquist, Mark, *Case Study: EM and seismic analysis on Prospect in Deepwater Niger Delta*, page 14, Integration of Seismic and Electromagnetic Measurements Workshop, SEG International Exhibition and 76th Annual Meeting, 1-6 Oct. 2006, New Orleans, United States of America Ostrander 1984: Ostrander, W. J., 1984, *Plane-wave reflection coefficients for gas sands at non-normal angles of incidence*, Geophysics, vol. 49, p. 1637-1648

Strack 1992: Strack K-M, Exploration with Deep Transient Electromagnetic, Elsevier 1992, ISBN 0 444 89541 8

Veeken and Rauch-Davies 2006: Paul Veeken and Marianne Rauch-Davies, *AVO attribute analysis and seismic reservoir characterization*, First Break, vol. 24, Feb. 2006, pages 41-52

Zhanxiang 2006: Zhanxiang, He, *Integrating processing and interpretation of EM and seismic data—an effective means for complex hydrocarbon objective*, pages 12-14, Integration of Seismic and Electromagnetic Measurements Workshop, SEG International Exhibition and 76th Annual Meeting, 1-6 Oct. 2006, New Orleans, United States of America

What is claimed is:

1. A computer apparatus loaded with machine executable instructions for implementing a method of characterising a hydrocarbon reservoir contained in a region of interest, the method comprising:
   providing the computer apparatus with a set of measured controlled source electromagnetic (CSEM) data of the region of interest;
   providing the computer apparatus with a set of measured seismic data of the region of interest;
   defining in the computer apparatus an earth model of the region of interest by setting values of a plurality of earth model parameters;
   defining in the computer apparatus a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity;
   setting in the computer apparatus values for the rock property parameters;
   computing in the computer apparatus a set of synthetic CSEM data of the region of interest with said values of the rock property parameters and using survey equipment parameters for a CSEM transmitter and CSEM receivers matched to those used when collecting said measured CSEM data;
   computing in the computer apparatus a set of synthetic seismic data of the region of interest with said values of the rock property parameters and using survey equipment parameters for a seismic transmitter and seismic receivers matched to those used when collecting said measured seismic data; and
   perturbing in the computer apparatus the values of at least a subset of the rock property parameters in order to find a fit of the synthetic CSEM and seismic data to the measured CSEM and seismic data respectively, thereby to determine the hydrocarbon saturation level of the hydrocarbon reservoir.

2. The computer apparatus of claim 1, wherein the hydrocarbon saturation level includes an oil saturation level and a gas saturation level so that the step of perturbing the values of the rock property parameters establishes whether the hydrocarbon reservoir is a gas reservoir or an oil reservoir.

3. The computer apparatus of claim 1, wherein said seismic data includes amplitude versus offset (AVO) data.

4. The computer apparatus of claim 1, the method comprising:
   providing the computer apparatus with a further set of measured CSEM data of the region of interest and a further set of measured seismic data of the region of interest, wherein a significant volume of hydrocarbon has been extracted from the hydrocarbon reservoir during the time between obtaining the original and further sets of measured data;
   applying the method of claim 1 to the further sets of measured CSEM and seismic data using substantially the same earth model and rock physics model, and perturbing substantially only the values of the water and hydrocarbon saturation levels in the hydrocarbon reservoir and/or extent of the hydrocarbon reservoir in the earth model in order to find a fit of the further synthetic CSEM and seismic data to the further measured CSEM and seismic data respectively; and
   determining in the computer apparatus the effect of extraction on the reservoir by comparing changes between the saturation levels and/or extent of the hydrocarbon reservoir between said original and said further measurements.

5. A method of hydrocarbon extraction comprising:
   providing a computer apparatus with a set of measured controlled source electromagnetic (CSEM) data of the region of interest;
   providing the computer apparatus with a set of measured seismic data of the region of interest;
   defining in the computer apparatus an earth model of the region of interest by setting values of a plurality of earth model parameters;
   defining in the computer apparatus a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity;
   setting in the computer apparatus values for the rock property parameters;
   computing in the computer apparatus a set of synthetic CSEM data of the region of interest with said values of the rock property parameters and using survey equipment parameters for a CSEM transmitter and CSEM receivers matched to those used when collecting said measured CSEM data;
   computing in the computer apparatus a set of synthetic seismic data of the region of interest with said values of the rock property parameters and using survey equipment parameters for a seismic transmitter and seismic receivers matched to those used when collecting said measured seismic data;
   perturbing in the computer apparatus the values of at least a subset of the rock property parameters in order to find a fit of the synthetic CSEM and seismic data to the measured CSEM and seismic data respectively, thereby to determine the hydrocarbon saturation level of the hydrocarbon reservoir;
   penetrating the hydrocarbon reservoir with a hydrocarbon-producing well; and
   extracting a volume of hydrocarbon from the hydrocarbon reservoir.

6. The method of claim 5, wherein said penetrating and extracting steps are carried out conditionally on obtaining an affirmative result from determining whether the measured hydrocarbon saturation level is sufficiently high to render the hydrocarbon reservoir commercially viable.

7. The method of claim 5, comprising:
   providing the computer apparatus with a further set of measured CSEM data of the region of interest and a further set of measured seismic data of the region of interest, wherein a significant volume of hydrocarbon has been extracted from the hydrocarbon reservoir during the time between obtaining the original and further sets of measured data;

applying the method of claim 5 to the further sets of measured CSEM and seismic data using substantially the same earth model and rock physics model, and perturbing substantially only the values of the water and hydrocarbon saturation levels in the hydrocarbon reservoir and/or extent of the hydrocarbon reservoir in the earth model in order to find a fit of the further synthetic CSEM and seismic data to the further measured CSEM and seismic data respectively;

determining in the computer apparatus the effect of extraction on the reservoir by comparing changes between the saturation levels and/or extent of the hydrocarbon reservoir between said original and said further measurements; and extracting an additional volume of hydrocarbon from said hydrocarbon reservoir at a reduced rate taking account of the said hydrocarbon saturation level.

8. The method of claim 5, further comprising:

providing the computer apparatus with a further set of measured CSEM data of the region of interest and a further set of measured seismic data of the region of interest, wherein a significant volume of hydrocarbon has been extracted from the hydrocarbon reservoir during the time between obtaining the original and further sets of measured data;

applying the method of claim 5 to the further sets of measured CSEM and seismic data using substantially the same earth model and rock physics model, and perturbing substantially only the values of the water and hydrocarbon saturation levels in the hydrocarbon reservoir and/or extent of the hydrocarbon reservoir in the earth model in order to find a fit of the further synthetic CSEM and seismic data to the further measured CSEM and seismic data respectively;

determining in the computer apparatus the effect of extraction on the reservoir by comparing changes between the saturation levels and/or extent of the hydrocarbon reservoir between said original and said further measurements; and penetrating the hydrocarbon reservoir with an additional hydrocarbon-producing well at a location taking account of the said extent of the hydrocarbon reservoir.

9. A computer apparatus loaded with machine executable instructions for implementing a method of planning a survey of a region of interest, the method comprising:

defining in the computer apparatus an earth model of the region of interest by setting values for a plurality of earth model parameters;

defining in the computer apparatus a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity;

defining in the computer apparatus a set of survey equipment parameters defining controlled source electromagnetic (CSEM) and seismic transmitter and receiver properties;

setting in the computer apparatus at least two different values of at least one of the rock property parameters to postulate different possible scenarios for a potential reservoir;

setting in the computer apparatus singular values for the other rock property parameters and the survey equipment parameters;

computing in the computer apparatus sets of synthetic CSEM and seismic data of the region of interest with said values of earth model and rock property parameters; and establishing in the computer apparatus whether the different possible scenarios are distinguishable in the synthetic CSEM and seismic data, and if yes, using those survey equipment parameters to define a future survey.

10. The computer apparatus of claim 9, the method comprising:

perturbing in the computer apparatus the survey equipment parameters to maximise distinguishability of the different possible scenarios in the synthetic CSEM and seismic data, and using those survey equipment parameters to define a future survey.

11. The computer apparatus of claim 9, wherein said establishing takes account of receiver signal levels and noise levels.

12. The computer apparatus of claim 9, wherein said at least one of the rock property parameters is water saturation level and hydrocarbon saturation level.

13. The computer apparatus of claim 9, wherein said synthetic seismic data includes amplitude versus offset (AVO) data.

14. A method of performing a joint controlled source electromagnetic (CSEM) and seismic survey of a region of interest, comprising:

defining in a computer apparatus an earth model of the region of interest by setting values for a plurality of earth model parameters;

defining in the computer apparatus a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity;

defining in the computer apparatus a set of survey equipment parameters defining controlled source electromagnetic (CSEM) and seismic transmitter and receiver properties;

setting in the computer apparatus at least two different values of at least one of the rock property parameters to postulate different possible scenarios for a potential reservoir;

setting in the computer apparatus singular values for the other rock property parameters and the survey equipment parameters;

computing in the computer apparatus sets of synthetic CSEM and seismic data of the region of interest with said values of earth model and rock property parameters; and establishing in the computer apparatus different scenarios that are distinguishable in the synthetic CSEM and seismic data; and performing a joint CSEM and seismic survey of a region of interest using said survey equipment parameters.

15. A volume of hydrocarbon obtained by:

providing a computer apparatus with a set of measured controlled source electromagnetic (CSEM) data of the region of interest;

providing the computer apparatus with a set of measured seismic data of the region of interest;

defining in the computer apparatus an earth model of the region of interest by setting values of a plurality of earth model parameters;

defining in the computer apparatus a rock physics model with a plurality of interdependent relations linking rock property parameters of the region of interest, including porosity, elasticity moduli, water saturation level and hydrocarbon saturation level, with elastic and electrical parameters of the region of interest, including P-wave velocity, S-wave velocity and electrical conductivity;

setting in the computer apparatus values for the rock property parameters;

computing in the computer apparatus a set of synthetic CSEM data of the region of interest with said values of the rock property parameters and using survey equipment parameters for a CSEM transmitter and CSEM receivers matched to those used when collecting said measured CSEM data;

computing in the computer apparatus a set of synthetic seismic data of the region of interest with said values of the rock property parameters and using survey equipment parameters for a seismic transmitter and seismic receivers matched to those used when collecting said measured seismic data;

perturbing in the computer apparatus the values of at least a subset of the rock property parameters in order to find a fit of the synthetic CSEM and seismic data to the measured CSEM and seismic data respectively, thereby to determine the hydrocarbon saturation level of the hydrocarbon reservoir;

penetrating the hydrocarbon reservoir with a hydrocarbon-producing well; and extracting a volume of hydrocarbon from the hydrocarbon reservoir.

16. The volume of hydrocarbon of claim 15, wherein said penetrating and extracting steps are carried out conditionally on obtaining an affirmative result from determining whether the measured hydrocarbon saturation level is sufficiently high to render the hydrocarbon reservoir commercially viable.

* * * * *